May 23, 1933.  H. FRISCHER  1,910,101
APPARATUS FOR THE TREATMENT OF ACIDS AND ACID MATERIALS
Filed Feb. 7, 1930
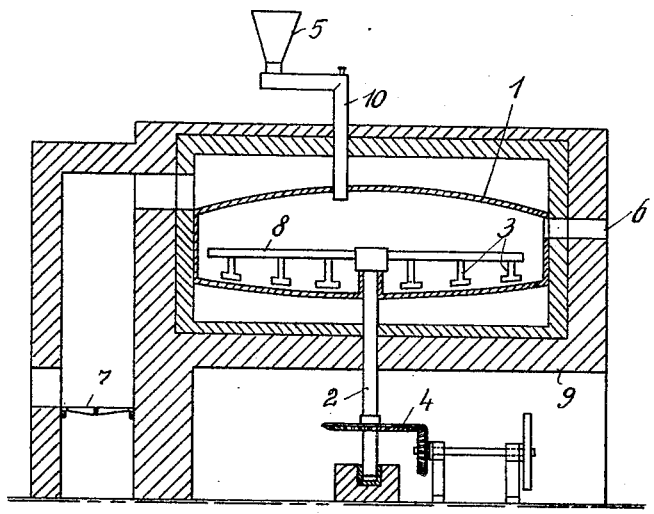
Inventor:
Hermann Frischer
by Ken—————
Atty.

Patented May 23, 1933

1,910,101

UNITED STATES PATENT OFFICE

HERMANN FRISCHER, OF COLOGNE-LINDENTHAL, GERMANY

APPARATUS FOR THE TREATMENT OF ACIDS AND ACID MATERIALS

Application filed February 7, 1930, Serial No. 426,736, and in Germany December 13, 1928.

I have made application for patent in Germany on December 13, 1928.

My invention refers to mechanical furnaces for the production of sulfate and hydrochloric acid from alkali chlorides and sulfuric acid.

As is well known to those skilled in the art, those parts of a furnace of this description, which are in direct contact with the molten sulfate, had hitherto been made either from fire clay (chamotte) or from cast iron. This latter material has also been used in the construction of the movable parts of the furnace, such as the scraping and stirring devices.

These materials have been found to be sensitive to the corrosive action of the alkali sulfate and to mechanical shocks and abrasion.

I have now found that bricks formed from silicon carbide (carborundum) or from materials containing silicon carbide are far more resistive to the corrosive action of the sulfate and that the same material can be used with great advantage in the construction of the stirring and scraping devices, being, contrary to expectations, highly resistive to the shocks resulting from the mechanical drive of these devices.

I have found that quite especially such parts of the agitating and stirring device which are instrumental in mixing and stirring the sulfate can advantageously be made from carbide material, such as silicon carbide.

I am aware that silicon carbide has already been suggested for use in the construction of metallurgical furnaces and in the construction of the arch or roof of furnaces of the type to which the present invention relates. However, the arch or roof of a mechanical sulfate furnace is merely exposed to acid fumes, but not in contact with the molten sulfate, and it is not exposed to any mechanical strain.

In contradistinction thereto it was rather astonishing to find that silicon carbide is particularly useful in the construction of those parts of the furnace, which are exposed to contact with the hot molten sulfate, for silicon carbide is generally known to be readily oxidizable by sulfates at higher temperatures, the sulfates being at the same time reduced to sulfides. Contrary to this fact I have found that the sole or bottom of a mechanical sulfate furnace made from silicon carbide is not attacked in any appreciable manner by the reacting masses.

I have further found that contrary to expectations silicon carbide possesses the mechanical strength required for enabling the agitating, stirring and scraping devices to be made from this material, which is the more astonishing as hitherto nobody would have believed that these devices, which are exposed to severe mechanical strain, apart from the corrosive action of hot molten sulfate, could be made from a mineral substance.

In the drawing affixed to this specification and forming part thereof a furnace embodying my invention is illustrated diagrammatically by way of example in vertical longitudinal section.

Referring to the drawing, 1 is the closed pan or retort, 2 is a vertical shaft extending through an opening in the bottom of the retort, 8 is a stirring arm at the top end of shaft 2, 3 are scrapers fixed to the arm 8. 9 is the brickwork supporting and enclosing the retort, 5 is a charging hopper, 10 is an elbow pipe projecting through the brickwork and the cover of the retort, 6 is an outlet for gases formed in the operation of the furnace, 7 is the grate, 4 is a cone wheel gear serving to set the shaft 2 rotating.

In this furnace the bottom of the retort 1, the arm 8, the pipe 10 and the scrapers 3 are made of silicon carbide or of ceramic materials comprising silicon carbide.

I wish it to be understood that I do not desire to be limited to the exact details of construction shown and described for obvious modifications will occur to a person skilled in the art.

I claim:—

1. A mechanical sulfate furnace provided with a retort and mechanical scrapers for stirring molten sulfate within said retort, the operative portion of said scrapers being made of ceramic materials comprising silicon carbide.

2. A mechanical sulfate furnace provided with a retort, the bed and other portions which come in contact with molten sulfate being constructed of ceramic materials comprising silicon carbide.

3. A mechanical sulfate furnace provided with a retort and mechanical scrapers for stirring molten sulfate within said retort, the operative portions of said scrapers and the floor of said retort being constructed of ceramic materials comprising silicon carbide.

4. A mechanical sulfate furnace comprising a retort, mechanical scrapers within said retort and a charging conduit; the floor of said retort, the operative portions of said scrapers and the charging conduit being constructed of ceramic materials comprising silicon carbide.

5. In the manufacture of hydrochloric acid and alkali metal sulfates, the process which comprises heating a mixture of an alkali metal chloride with sulfuric acid in a retort, and stirring the mixture while heating, the bottom of the said retort being constructed of ceramic materials comprising silicon carbide.

6. The process of claim 5 wherein the operative portions of the stirring mechanism are also constructed of ceramic materials comprising silicon carbide.

In testimony whereof I affix my signature.

HERMANN FRISCHER.